United States Patent
Kowles

(10) Patent No.: US 10,496,280 B2
(45) Date of Patent: Dec. 3, 2019

(54) COMPRESSION SAMPLING IN TIERED STORAGE

(71) Applicant: SEAGATE TECHNOLOGY LLC, Cupertino, CA (US)

(72) Inventor: Andrew M. Kowles, Lyons, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 578 days.

(21) Appl. No.: 14/865,487

(22) Filed: Sep. 25, 2015

(65) Prior Publication Data

US 2017/0090775 A1    Mar. 30, 2017

(51) Int. Cl.
*G06F 3/06* (2006.01)

(52) U.S. Cl.
CPC .......... *G06F 3/0608* (2013.01); *G06F 3/0611* (2013.01); *G06F 3/0619* (2013.01); *G06F 3/0644* (2013.01); *G06F 3/0647* (2013.01); *G06F 3/0655* (2013.01); *G06F 3/0685* (2013.01)

(58) Field of Classification Search
CPC .... G06F 3/0608; G06F 3/0685; G06F 3/0655; G06F 3/0611; G06F 3/0644
See application file for complete search history.

(56) References Cited

U.S. PATENT DOCUMENTS

| | | | |
|---|---|---|---|
| 2006/0050953 A1* | 3/2006 | Farmer | G06K 9/4642 |
| | | | 382/159 |
| 2007/0088920 A1 | 4/2007 | Garcia et al. | |
| 2009/0112949 A1* | 4/2009 | Ergan | G06F 12/0802 |
| 2011/0246832 A1* | 10/2011 | Akiyama | G06F 3/0607 |
| | | | 714/37 |
| 2013/0254441 A1 | 9/2013 | Kipnis et al. | |
| 2014/0006745 A1* | 1/2014 | Fontenot | G06F 12/04 |
| | | | 711/170 |
| 2014/0055881 A1* | 2/2014 | Zaharris | G11B 5/012 |
| | | | 360/55 |
| 2014/0195498 A1* | 7/2014 | Asher | H03M 7/4037 |
| | | | 707/693 |
| 2014/0244604 A1 | 8/2014 | Oltean et al. | |
| 2014/0254042 A1* | 9/2014 | Yeo | G11B 20/1217 |
| | | | 360/48 |

* cited by examiner

*Primary Examiner* — Getente A Yimer
(74) *Attorney, Agent, or Firm* — Holland & Hart LLP

(57) ABSTRACT

A method for data steering in tiered storage is described. In one embodiment, the method includes ranking storage areas of a storage device according to latency of access. In some embodiments, the storage areas include at least a first storage area and a second storage area. The method includes identifying first data at the storage device, passing a portion of the first data through a compression algorithm, and analyzing a result of passing the portion of the first data through the compression algorithm. In some cases, the result includes a score of compression savings associated with the portion of the first data. If the result satisfies a threshold associated with the first storage area, the first data is stored in the first storage area. If the result satisfies a threshold associated with the second storage area, the first data is stored in the second storage area.

18 Claims, 8 Drawing Sheets

COMPRESSION SAMPLING IN TIERED STORAGE

SUMMARY

The disclosure herein includes methods and systems for compression sampling of data in relation to a multi-tiered storage system. In one embodiment, the method includes ranking a plurality of storage areas of a storage device according to at least one property of the plurality of storage areas. In some cases, the at least one property of the plurality of storage areas includes one or more of type of storage media, media latency (e.g., access time, response time, seek time, rotational latency, etc.), reliability, data retention, addressability (e.g., byte, block, word, etc.), data storage durability, media durability, media rate, write speed, read speed, sustained write speed, sector overhead time, head switch time, cylinder switch time, power consumption, operation history, etc. In some embodiments, the plurality of storage areas may include at least a first storage area and a second storage area. The method may include obtaining a sample of data at the storage device, analyzing a result of passing the sample of data through one or more compression codecs, and storing the data in one of the plurality of storage areas based at least in part on the analyzing the result of passing the sample of data through the one or more compression codecs. The one or more compression codecs may include one or more compression algorithms, compression encoders, and/or compression decoders. In some cases, the result may include a score of compression savings associated with the sample of data.

In one embodiment, the method may include passing the sample through a data heat detection algorithm to detect one or more aspects of the data prior to passing the sample of data or in parallel with passing the sample of data through the one or more compression codecs. In some cases, the method may include passing the sample of data through a first compression algorithm while passing the sample of data through a second compression algorithm different than the first compression algorithm, passing the sample through the heat detection algorithm while passing the sample of data through the first and second compression algorithms, analyzing a result of passing the sample of data through the first and second compression algorithms and the heat detection algorithm, and analyzing the result in relation to a history of past results of the analyzing. In some embodiments, the method may include identifying a type of data based at least in part on the analyzing.

In some embodiments, upon determining the data is more likely than not to be metadata, based at least in part on passing the sample through a data heat detection algorithm, the method may include passing the sample of data a single time through one of the one or more compression codecs. Upon determining the data is more likely not to be metadata, based at least in part on passing the sample through a data heat detection algorithm, the method may include passing the sample of data two or more times through the one or more compression codecs. In some embodiments, upon determining the data is more likely than not to be metadata, the method may include compressing the data using a compression code and/or output encoding optimized for metadata (e.g., Huffman code or other code, etc.).

In one embodiment, the method may include detecting a file system type associated with the data based at least in part on a result of passing the sample of data through the one or more compression codecs and selecting a compression algorithm to compress the data based on the detected file system type. The method may include steering the data to one of the plurality of storage areas based at least in part on the detected file system type. In some cases, the method may include bypassing at least one of heat detection and compression sampling based on data patterns learned from prior passing of samples through the one or more compression codecs.

In one embodiment, the method may include analyzing multiple, different samples of the data simultaneously. The analyzing multiple samples of the data may include passing the multiple samples through the one or more compression codecs using a different compression algorithm per sample. In some embodiments, the method may include analyzing multiple copies of the same sample of data simultaneously. The analyzing may include passing the multiple copies of the same sample of data through two or more different compression algorithms, one algorithm per copy of the sample. In some cases, the method may include steering the data to one of the plurality of storage areas based at least in part on the analyzing of the multiple samples.

In one embodiment, the storage device includes an array of hard disk drives (HDDs) and the method may include determining which disks in the array of HDDs are active (e.g., which disks are actively spinning) and which disks are non-active (e.g., which disks are spun down). In some cases, the method may include steering the sampled data towards one or more active disks in the array of HDDs while bypassing one or more non-active disks in the array of HDDs to avoid a latency associated with spun-down disks of the non-active disks. In some cases, the method may include sampling data from one or more active disks in the array of HDDs while bypassing sampling data from one or more non-active disks in the array of HDDs. In one embodiment, the storage device may include at least one shingled storage area and at least one non-shingled storage area. Upon determining the sample of data satisfies a low compressibility threshold, based in least in part on passing the sample of data through the one or more compression codecs, the method may include storing the data in a shingled storage medium. Upon determining the sampled data satisfies a high compressibility threshold, based in least in part on passing the sample of data through the one or more compression codecs, the method may include storing the data in a non-shingled storage medium. In some cases, the method may include sampling new data in real time as the new data is received to be written to the storage device.

In some embodiments, the present systems and methods may include ranking storage areas of a storage device according to at least one property of the plurality of storage areas. In some cases, the storage areas include at least a relatively low latency storage area and a relatively high latency storage area. In some embodiments, the storage areas may include at least a first storage area and a second storage area. The method may include identifying first data at the storage device, passing a portion of the first data through a compression algorithm, and analyzing a result of passing the portion of the first data through the compression algorithm. In some cases, the result may include a score of compression savings associated with the portion of the first data. Compression savings may be a percentage. For example, compression savings may be defined as (1−(Compressed Size/Original Size))*100. If the result satisfies a threshold associated with the first storage area, the first data may be stored in the first storage area. If the result satisfies a threshold associated with the second storage area, the first data may be stored in the second storage area. In one embodiment, the score of compression savings includes a value between a range of compression savings. For example, the range of compression savings as defined mathematically may be from 0% to 100% savings.

In some cases, the storage device includes an object-based storage device. Thus, the first data may include a data object. In one embodiment, the method may include passing at least a portion of the data object through the compression algorithm and analyzing a result of passing at least a portion of a data object through the compression algorithm. Thus, the result may include a score of compression savings associated with the data object.

In some embodiments, the storage device may include a block-based storage device. Thus, the portion of the first data may include a block of data selected based at least in part on an adaptive data sampling criteria. In some cases, the storage device includes at least one hard disk drive, at least one solid-state drive storage area, and/or at least one random access memory (RAM) storage area. In one embodiment, the at least one hard disk drive includes a relatively low latency disk storage area and a relatively high latency disk storage area.

In some embodiments, the method may include receiving second data after storing the first data in the first storage area. Upon determining an analysis of the second data indicates a score of lower compression savings than the first data, the method may include moving the first data to the second storage area and storing the second data in the first storage area. For example, the first data may be replaced by the second data in the first storage area and the first data may be migrated to the second storage area. Upon determining the analysis of the second data indicates a score of lower compressibility than the first data, the method may include keeping the first data in the first storage area and storing the second data in the second storage area.

In some embodiments, the method may include analyzing the portion of the first data, that portion based at least in part on a time-series data heat algorithm's determination of heat and comparing a result from the time-series data heat algorithm analysis to the result of the compression algorithm analysis. Upon determining that the results of each analysis correlate, the method may include storing the first data according to the result of the compression algorithm analysis. Upon determining the results of each analysis do not correlate, the method may include modifying the time-series data heat algorithm to correlate with the compression algorithm analysis. In some cases, the weight of the importance placed on the heat algorithm results may be modified based on the results of each analysis failing to correlate. In some cases, the method may include taking multiple compression samples of the first data simultaneously and passing the multiple compression samples through a set of different compression algorithms. In some cases, the multiple compressions samples may include multiple copies of the same sample.

An apparatus for compression sampling in tiered storage is also described. In one embodiment, the apparatus may include a processor, memory in electronic communication with the processor, and instructions stored in the memory, the instructions being executable by the processor to perform the steps of ranking a plurality of storage areas of a storage device according to at least one property of the plurality of storage areas. In some cases, the at least one property of the plurality of storage areas includes one or more of type of storage media, media latency (e.g., access time, response time, seek time, rotational latency, etc.), reliability, durability, data retention, addressability, media durability, media rate, write speed, read speed, sustained write speed, sector overhead time, head switch time, cylinder switch time, power consumption, operation history, etc. In some embodiments, the plurality of storage areas may include at least a first storage area and a second storage area. In some embodiments the instructions may be executable by the processor to perform the steps of obtaining a sample of data at the storage device, analyzing a result of passing the sample of data through one or more compression codecs, and storing the data in one of the plurality of storage areas based at least in part on the analyzing the result of passing the sample of data through the one or more compression codecs. In some cases, the result may include a score of compression savings associated with the sample of data.

In one embodiment, the apparatus may include a processor, memory in electronic communication with the processor, and instructions stored in the memory, the instructions being executable by the processor to perform the steps of ranking storage areas of a storage device according to at least one property of the plurality of storage areas. In some cases, the storage areas include at least a relatively low latency storage area and a relatively high latency storage area. In some embodiments, the storage areas may include at least a first storage area that is low latency and a second storage area that has a different latency rating (e.g., a relatively higher latency) and/or another property which distinguishes it from the first area, such as data throughput rates, storage medium durability, addressability, etc. The method may include identifying first data at the storage device, passing a portion of the first data through a compression algorithm, and analyzing a result of passing the portion of the first data through the compression algorithm. In some cases, the result may include a score of compression savings associated with the portion of the first data. If the result satisfies a threshold associated with the first storage area, the first data may be stored in the first storage area. If the result satisfies a threshold associated with the second storage area, the first data may be stored in the second storage area.

A non-transitory computer-readable medium is also described. The non-transitory computer readable medium may store computer-executable code, the code being executable by a processor to perform the steps of ranking a plurality of storage areas of a storage device according to at least one property of the plurality of storage areas. In some cases, the at least one property of the plurality of storage areas includes one or more of type of storage media, media latency (e.g., access time, response time, seek time, rotational latency, etc.), reliability, durability, data retention, addressability, media durability, media rate, write speed, read speed, sustained write speed, sector overhead time, head switch time, cylinder switch time, power consumption, operation history, etc. In some embodiments, the plurality of storage areas may include at least a first storage area and a second storage area. In some embodiments the instructions may be executable by the processor to perform the steps of obtaining a sample of data at the storage device, analyzing a result of passing the sample of data through one or more compression codecs, and storing the data in one of the plurality of storage areas based at least in part on the analyzing the result of passing the sample of data through the one or more compression codecs. In some cases, the result may include a score of compression savings associated with the sample of data In some embodiments, the non-transitory computer readable medium may store computer-executable code, the code being executable by a processor to perform the steps of ranking storage areas of a storage device according to at least one property of the plurality of storage areas. In some cases, the storage areas include at least a relatively low latency storage area and a relatively high latency storage area. In some embodiments, the storage areas may include at least a first storage area and a second storage area. The method may include identifying first data at the storage device, passing a portion of the first data through a compression algorithm, and analyzing a result of passing the portion of the first data through the compression algorithm. In some cases, the result may include a score of compression savings associated with the portion of the first data. If the result satisfies a threshold associated with the first storage area, the first data may be stored in the first storage area. If the result satisfies a threshold associated with the second storage area, the first data may be stored in the second storage area.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
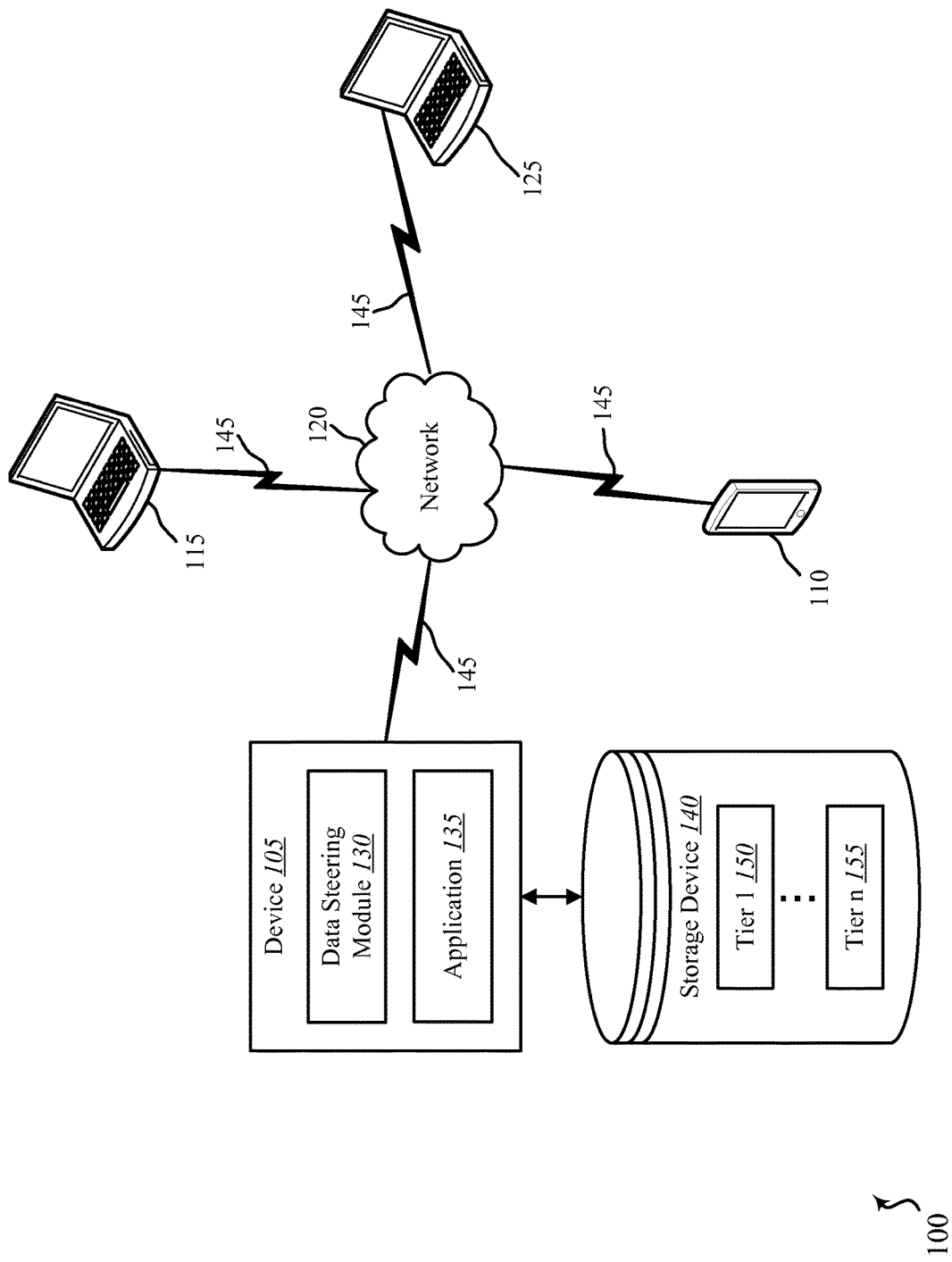
FIG. 1 is a block diagram of an example of a system in accordance with various embodiments.

The following relates generally to compression sampling in tiered storage devices and systems. Higher compression ratios may be a distinguishing characteristic of system metadata in relation to data content in certain storage systems. As described herein, a system may sample the compression ratio of data in order to help determine an optimal management of the sampled data for the purpose of attaining various system requirements. In some embodiments, the proposed embodiments do not store the data in compressed form, as in prior art. Rather the system may use the sampled compression properties to optimally steer uncompressed data for the purposes of improving performance, reliability, and power characteristics. In some cases, the system may use the current compression sample to determine a property of the sampled data and spatially or temporally local data, such as the data heat (i.e., future expected frequency of access, the hotter the data the more frequent the access). In some cases, the system may use the current compression ratio sample as well as the past history of compression ratios to determine the property of the sampled data. The determined properties of the data may include data heat, rate of change of data heat, rate of change of data heat direction, whether the data is already compressed, zero entropy, duplicate, etc. The system may sample incoming data to be stored in the storage system and/or data already stored in the storage system in any tier.

In one embodiment, an example multi-tiered storage device may include a NAND flash drive and one or more magnetic disks. In one configuration, at least one of the one or more magnetic disks includes shingled magnetic recording (SMR) and at least one of the one or more magnetic disks includes non-shingled storage. In some cases, the same magnetic disk from the one or more magnetic disks employs both SMR and non-shingled storage. Additionally, or alternatively, one of the magnetic disks from the one or more magnetic disks employs SMR and a different one of the magnetic disks from the one or more magnetic disks and/or flash drives employ non-shingled storage. In some embodiments, the multi-tiered storage device may include any combination of hard disk drive storage, shingled magnetic recording (SMR) hard disk drives, conventional magnetic recording (CMR) hard disk drives, solid state storage, non-volatile RAM storage, etc. The multi-tiered storage device may include one or more of the following properties:

| Media Tier Name | Media Type | Distinguishing Properties |
| --- | --- | --- |
| First | NAND Flash | Low latency, low durability, hot data storage tier |
| Second | Magnetic Disk | Medium latency unshingled, high durability, dynamic mapping, disk cache |
| Third | Magnetic Disk | High latency shingled, dense, cold data storage tier |

In one embodiment, compression sampling may be adaptive to the data being sampled. For example, the method of when and where sampling occurs may vary by frequency (e.g., samples per unit time, etc.) in some embodiments. Additionally, or alternatively, the sampling may vary by spatial density (e.g., samples per block address range (e.g., per kibibyte (KiB), per mebibyte (MiB), etc.), per object, per file, etc.). Compression sampling may either be augmented or stimulated by existing data heat detection algorithms or used to validate the effectiveness of data heat detection algorithms. The system may steer incoming data between data storage tiers based on a detected heat of the data indicated by the data's compressibility. The system may also move data between tiers asynchronously based on the results of one or more compression samples. The movement of data between any two tiers may provide opportunity to conduct another sample (with possibly a different compression algorithm) or the initial sample.

High data heat indicates a relatively high or increasing data access frequency. Data heat is typically bifurcated between read and write classes. Hot data may include frequently accessed data, while cold data includes seldom accessed data. Cold data may be infrequently accessed data (e.g., once a year or less, etc.), hot data frequently accessed (e.g., several times a day, etc.), and tepid data intermittently accessed (e.g., once a day, once a week, once a month, etc.). Data heat may be measured in a continuous range of data heat from cold (e.g., written once, never read) to hot (e.g., same addresses written every 350 ms). Data heat may be inferred to have an inverse relationship with data entropy, for certain system's observed natural workloads. In one example, cold data may include a particular movie file (e.g., MPEG compressed file) a user may watch once (or in some cases never) or a photo (e.g., JPEG compressed file) a user saves and rarely if ever views again. In some embodiments, data heat may be determined by sampling for compression ratios associated with data. Thus, in some situations, data may be determined to be write or read hot based on the degree to which the data is compressible as sampled during transfer from the host, or transfer between memory to storage or from a first storage tier to a second storage tier, etc.

In some embodiments, data may be sampled to determine whether the data is within one or two or more compressibility ranges. For example, a sample indicating data is within a lowest compressibility range or that indicates the data has negative compression savings may be stored in a high latency data tier (e.g., high latency shingled media, a high latency hard disk drive in a multi-tiered storage appliance, etc.). For example, MPEG and JPEG file formats (typically highly compressed files encoded using lossy codecs) have high entropy, which indicates cold "content" data, and thus may be stored in a higher latency tier. A sample indicating data falls within a medium range may be stored in a medium-speed tier (e.g., non-shingled media, solid state drive, etc.), and a sample indicating data falls within a highest compressibility range may be stored in a low latency nonvolatile storage tier (e.g., solid state drive, high-RPM hard drive, spin transfer torque magnetic random access memory (STT-MRAM), resistive random-access memory (ReRAM), Phase Change Memory, battery-backed dynamic read-access memory NVRAM) storage device). In some cases, read vs. write heat properties of the data may influence the choice of storage medium/tier.

It is noted that content in networked storage systems may be stored in an erasure coded storage system rather than RAID storage system. In one embodiment, the system may determine a compressibility of data to distinguish file system and OS metadata (e.g., Inodes in Linux EXT4, or a Windows Registry) from content (e.g., user data, user files, etc.). In some cases, the stronger the correlation between compression ratio and system metadata, the fewer the number of samples may be needed to identify system metadata. Where a strong correlation between high compression ratio and system metadata exists, a single sample may identify system metadata and steer the data to a tier based on that single sample, thus reducing latency in the decision making process and reducing the need for buffering. In one embodiment, data heat detection algorithms may be used prior to a compression sample to identify one or more aspects of the data before determining the data's compressibility. For example, data heat detection may determine a likelihood the data sample is metadata before determining the data sample's compressibility. Alternately, a compression sample result may be fed into a workload or heat detection algorithm. In some embodiments, a single sample may be taken. For example, data determined to be more likely metadata may be sampled once. Data determined to be less likely metadata may be sampled two or more times.

Data determined by heat detection to be likely metadata may be then subject to a different compression algorithm and/or output encoding, one which is highly suitable for the metadata. The metadata may be stored, therefore, in either compressed or uncompressed form. If stored in compressed form, choice of optimized compression algorithms may provide significant advantages. The efficiency of a Huffman encoding, for example, benefits from certain arbitrary choices concerning the probabilities of particular characters and strings in the data stream. Over time, with compression sampling, Huffman codes particularly optimal to certain data may be built, maintained, and applied to data identified using the method of compression sampling. In one embodiment, a Huffman code may be customized to compress certain types of files. For example, after identifying metadata via heat detection, a Huffman code customized to metadata may be used to compress the metadata. The compressed metadata may then be stored.

Detection of properties of certain file systems is another useful outcome of compression sampling. For example, EXT4 is a Linux file system that is significantly different than other Linux file systems such as XFS and Butter FS. Discrimination of the file systems using compression sampling enables adapting the compression algorithms to be applied based on detected file type, steering the data to a particular tier based on detected file type, implementing tier/cache replacement policies based on detected file type, and/or blind steering where sampling or heat detection is no longer used due to the machine learning that has previously occurred about the file system layout. For example, a system may learn file system types associated with data based on information gather during prior sampling such as file source information, source location, destination target location, file size, etc.

In one embodiment, compression samples may be taken and analyzed in real time (e.g., as data is received to be written to the storage device). In one embodiment, multiple compression samples may be taken simultaneously with a set of different compression algorithms and, based on the relative results, inferences may be made about the data, thus enabling finer grained steering by more finely discriminating different data types in the system. In some embodiments, multiple compression samples may be taken simultaneously. The multiple compression samples may be passed through a set of different compression algorithms. In one embodiment, the multiple compression samples may be samples of a set of data that includes multiple files. Additionally, or alternatively, the multiple compression samples may be samples of data that is part of a single file. In some embodiments, the multiple samples may include multiple copies of the same sample. In one embodiment, the samples may be passed through algorithms in a one-sample-to-one-algorithm pattern. For example, a first of the multiple compression samples may be passed through a first of the set of different compression algorithms, a second of the multiple compression samples may be passed through a second of the set of different compression algorithms, and so on. Additionally, or alternatively, each sample may be passed through all of the set of different compression algorithms. For example, the first of the multiple compression samples may be passed through the first, second, third, etc., of the set of different compression algorithms, and so on.

In some embodiments, compression samples may be taken and analyzed in an offline manner. In some cases, deferred compression samples may be completed using performance patterns such as batching, or in parallel with other work or samples. Once the properties of the data are determined from the data sampling, data may be managed, migrated, and stored such that overall performance, latency, reliability, durability, or other attributes of the storage system may be optimized.

When system metadata is differentiated from content (e.g., photo files, movie files, financial data, documents, erasure coded distributed file system objects, etc.), the ability to discriminate provides advantages to the storage system. For example, the device or system may be enabled to make more optimal choices with more extensive information about the nature of the natural or typical workload. Additional advantages, resulting from these choices, may include higher device reliability, higher device performance, lower power consumption, etc. For example, consider a solid state hybrid drive (SSHD) in a computer system. The SSHD is a "multi-tiered" storage device because it includes different persistent storage media (e.g., magnetic disk, flash memory, charge backed DRAM, etc.), each with fundamentally different properties for data access, principally low vs. high data access latency (which may be different for reads and writes), durability, retention, addressibility, thus constituting storage "tiers" within the SSHD. Another example of a multitier storage system is a storage node in a distributed storage system, often encountered in cloud storage systems.

Each storage node, for example in a "cluster," includes a network appliance, having a network connection and socket, network facing middleware, application layer, storage middleware/file system, and a specified amount of persistent storage. Such a storage system may incorporate tiers in the form of a mix of low latency solid state drives (SSDs), medium latency hard disk drives (HDDs), and high latency HDDs. In some cases the system may include one or more of non-volatile (NV) memories such as Magnetic RAM or battery-backed DRAM (NV-RAM), and battery-backed static RAM (SRAM). In both the client and cloud system, the data arriving over the host interface to the individual storage devices may be largely sifted into two buckets: metadata and content. Metadata may include operating system data and data describing the content. Content may include any type of data depending on the applications and usage of a client system. Content often takes up the bulk of the capacity utilization of a storage system and is often, and increasingly, compressed, encrypted, and/or erasure coded to some degree. Local metadata, on the other hand, is often highly compressible in such a network appliance because the local metadata does not require security or expensive network bandwidth. An exception may include a RAID system where a subset of the storage array includes "parity drives," where the parity data (i.e., metadata) may have relatively high entropy, and therefore may already be compressed to some degree. Another exception may include content that is relatively compressible. An example of compressible content may include financial transaction data, text documents, etc. Decreasingly, however, content is encrypted and/or compressed, particularly when dealing with distributed data systems such as cloud storage. A highly compressible text file with a significant amount of white space may become highly entropic, and thus have relatively low compressibility after encryption. Also, financial records are typically compressed and/or encrypted prior to transmission across a network. Thus, even for compressible content there may be no compression performed at the appliance level in distributed storage systems.

In one embodiment, incoming data to a storage system is sampled for its compression ratio. Depending on the compression hardware topology and requirements for power and performance, sampling is done inline or offline. The compression information is stored in a data structure suitable for the purpose. The frequency and richness of compression sampling depends on several factors, such as memory requirements, and performance, etc. Additional workload metadata, for example data heat, may be used to determine the sampling configuration, as well as the optimum tier destination for the sampled data. Differentiation between tiers is used to steer data between, for example, low latency vs. high latency storage devices, and/or long retention (disk) vs. low retention (NAND Flash) storage devices. The resulting storage system is one which can more accurately differentiate system metadata from content, in the face of perhaps inconsistent or challenging host workloads.

As an example, a single 512B block may be sampled per 1 MiB of address space. The storage system may receive 500 4 KiB files. A first sample indicates high compressibility so the entire 1 MiB first sample, which includes a first half of the 500 4 KiB files, may be sent to a relatively low latency storage area (e.g., SSD). Even if some of the first 240 files are non-compressible (e.g., JPEG files), at least some compressible files are placed in the low latency storage area. Sampling the second 1 MiB set of data, which includes the second half of the 500 4 KiB files, may indicate low compressibility, so the entire 1 MiB second sample may be sent to a relatively high latency storage area (e.g., HDD). Again, even if some of the second 240 files are compressible (e.g., uncompressed text or financial documents), at least some non-compressible files are placed in the high latency storage area.

In some embodiments, a distribution of compressibility among all stored files or objects may be tracked. Those files that are most compressible may be stored in a relatively low latency storage area (e.g., SSD), and those files that are least compressible may be stored in a relatively high latency storage area (e.g., HDD). When new data is received, the distribution may be updated. If the new data is more compressible than most of the data in the relatively low latency storage, then at least some of the compressible data stored in the relatively low latency storage area may be moved to the relatively high latency storage and the new data may be stored in the relatively low latency storage area. If the new data is more compressed than most of the data in the relatively high latency storage area, then the less-compressed data in the relatively high latency storage area may be moved to the relatively low latency storage, and the new data may be moved to the high latency storage area. In some cases, new data may be stored in the high latency storage area without moving any of the data already stored. Generally, these are known as cache replacement policies. Here, they may be alternately referred to as tier replacement.

FIG. 1 is an example of a system 100 in accordance with various aspects of the disclosure. In some embodiments, the system 100 may include one or more devices 105, 110, 115, 125, and network 120. Device 105 may communicate via wired or wireless communication links 145 with one or more of the client computing devices 110, 115, 125, or network 120. The network 120 may enable devices 105, 110, 115 and/or 125 to communicate via wired or wireless communication links 145. In alternate embodiments, the network 120 may be integrated with any one of the devices 105, 110, 115 and/or 125, such that each device may communicate with one of the other devices directly, such as device 105 communicating directly with device 110 using a wireless and/or wired connection.

Device 105 may include a data steering module 130, an application 135, and one or more storage devices (e.g., storage device 140). Examples of device 105 may include a data server, a storage server, an object-based storage server, a personal computing device such as a laptop or desktop, and/or a mobile computing device. In some embodiments, device 105 may include a controller for storage device 140, For example, storage device 140 may include one or more hard disk drives controlled by device 105. Client computing devices 110, 115, 125 may include custom computing entities configured to interact, in conjunction with network 120, with device 105, data steering module 130, application 135, and/or storage device 140. In other embodiments, client computing devices 110, 115, 125 may include computing entities such as a personal computing device, a desktop computer, a laptop computer, a netbook, a tablet personal computer, a control panel, an indicator panel, a smart phone, a mobile phone, and/or any other suitable device operable to send and receive signals, store and retrieve data, and/or execute modules. In some embodiments, devices 110, 115, and/or 125 may be located remotely from device 105. Additionally, or alternatively, one or more of devices 110, 115, and/or 125 may be local to device 105.

In some embodiments, device 105 and storage device 140 may be part of a distributed data system. For example, device 105 and storage device 140 may be part of a node 160 of a distributed data system. Node 160 may include one or more web servers, database servers, network APIs, database connectivity middleware. In some cases, node 160 may utilize one or more of layers 1-7 in the Open Systems Interconnection model (OSI Model). Node 160 may provide network security, network connectivity, network application functionality. In some embodiments, node 160 may provide socket-level connectivity between a database management system and software and/or services (e.g., web applications, web-based services, etc.) that provide a sockets interface, enabling the direct exchange of data, in real time.

Storage device 140 may include one or more storage drives. In some cases, storage device 140 may include one or more object-based storage drives. Examples of storage device 140 include one or more of a hard disk drive, a solid state drive, a hybrid drive (e.g., a hard disk drive combined with a solid state drive), and/or a dynamic random access memory (DRAM) drive. Storage tiers may include at least one of magnetoresistive (MRAM), resistive (ReRAM), ferroelectric RAM (FerroRAM), phase-change memory (PCM), etc. Storage device 140 may include two or more storage tiers. For example, as illustrated, storage device 140 may include tier-1 150 up to tier-n 155. The storage tiers 150 to 155 may include a hard disk drive as a storage tier, a solid state drive as a storage tier, and/or a DRAM drive as a storage tier. In some cases, storage device 140 may include one or more hard disk drives, one or more solid state drive, and/or one or more DRAM drives. In one embodiment, the DRAM drive includes a battery to back up the data to the DRAM drive when the DRAM drive's main power is removed. In some cases, a storage drive may be split into two or more storage tiers. For example, a hard disk drive may be split into a low-latency tier and a high-latency tier. The latency of the high and low tiers may be based on the latency of a particular recording technology (e.g., low latency of recording data using traditional magnetic recording versus higher latency of advanced recording technologies such as heat-assisted magnetic recording or shingled magnetic recording, etc.). In some cases, the latency of the high and low tiers may be based on drive settings (e.g., lower latency of a disk spinning at full speed versus higher latency of a disk spinning at a less-than-full speed, etc.).

Devices 105, 110, 115, and 125 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the client computing devices 110, 115, 125, and/or device 105 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, data steering module 130. In some cases, data steering module 130 may be associated with executing an application such as application 135. Although application 135 is depicted as being on device 105, application 135 or a similar application may be on devices 110, 115, and/or 125. Data steering module 130 and/or application 135 may allow device 105 to enable at least one of client computing device 110, 115 and/or 125 to establish a connection with device 105. For example, device 105, in conjunction with data steering module 130 and/or application 135, may receive data from a client device (e.g., device 110, 115, and/or 125), analyze the received data, and based on the analysis, store the data in one of the storage tiers from tier 150 to tier 155 n.

Examples of networks 120 include cloud networks, local area networks (LAN), wide area networks (WAN), virtual private networks (VPN), a personal area network, BLUETOOTH®, near-field communication (NFC), a telecommunications network, wireless networks (using 802.11, for example), and/or cellular networks (using 3G and/or LTE, for example), etc. In some configurations, the network 120 may include the Internet and/or an intranet. The devices 105, 110, 115 and/or 125 may receive and/or send signals over the network 120 via wireless communication links 145. In some embodiments, a user may access the functions of client computing device 110, 115, 125. Additionally, or alternatively, a user may access functions of client computing devices 110, 115, 125 from device 105. For example, in some embodiments, device 105 may include a mobile application (e.g., application 135) that interfaces with one or more functions of client computing devices 110, 115, and/or 125.

Figure 2:
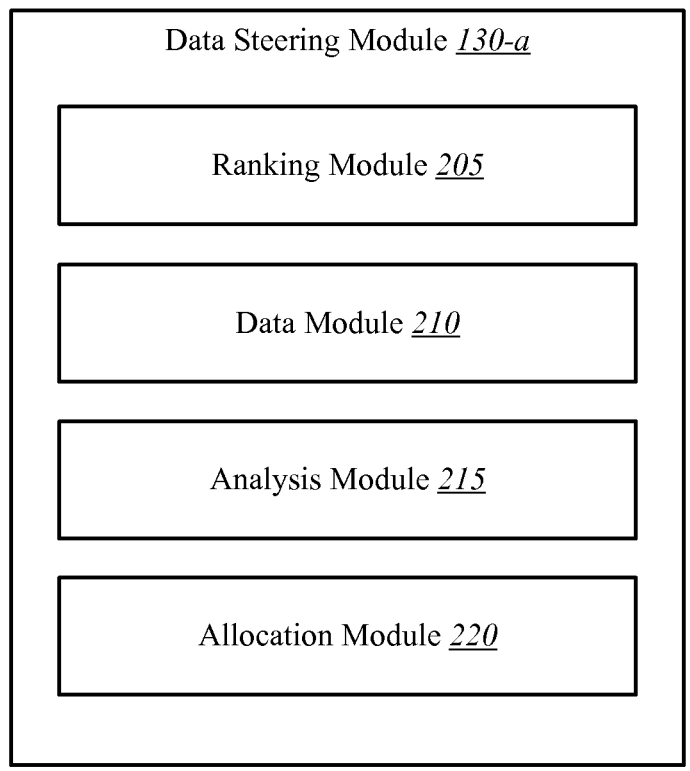
FIG. 2 is a block diagram of an example of a module in accordance with various embodiments.

FIG. 2 shows a block diagram 200 of a data steering module 130-a. The data steering module 130-a may include one or more processors, memory, and/or one or more storage devices. The data steering module 130-a may include ranking module 205, data module 210, analysis module 215, and allocation module 220. The data steering module 130-a may be one example of data steering module 130 of FIG. 1. Each of the illustrated components may be in communication with each other.

In one embodiment, the ranking module 205 may rank a plurality of storage areas of a storage device according to at least one property of the plurality of storage areas. For example, the storage areas may include multiple types of storage media, including shingled magnetic recording magnetic disk, non-shingled magnetic disk, non-volatile flash media (e.g., NAND flash media, NOR flash media, SSD, etc.), battery-backed DRAM, etc. Thus, the properties by which the storage areas may be ranked may include a data access latency (e.g., data access latency of flash media may be 2-3 order of magnitude faster than magnetic disk, etc.), media durability (e.g., HDD more durable than SSD, etc.), operation history, etc. In some cases, the plurality of storage areas may include at least a first storage area and a second storage area. In some cases, the storage device includes at least one of one or more hard disk drive storage areas, one or more solid-state drive storage areas, and/or one or more random access memory (RAM) storage areas. In some embodiments, the plurality of storage areas may include at least a relatively low latency storage area and a relatively high latency storage area. For example, the low latency storage area may include a solid-state drive storage area and the high latency storage area may include a hard disk drive storage area. In some cases, the plurality of storage area may include at least three storage areas, such as a lowest latency storage area, one or more medium latency storage areas, and a highest latency storage area. The lowest latency storage area may include a non-volatile RAM storage area, the next lowest latency storage area may include a solid-state drive storage area, the next lowest latency storage area may include a non-shingled hard disk drive, and the highest latency storage may include a shingled magnetic recording (SMR) hard disk drive. In some embodiments, the at least one hard disk drive storage area may include a low latency disk storage area and a high latency disk storage area. Thus, in some cases, the highest latency storage area may include a local low latency storage area and a local high latency storage area. Additionally, or alternatively, the lowest latency storage area, next lowest latency area, etc., may include two or more storage areas each, such as a local low latency storage area and a local high latency storage area, etc. In some cases, the hard disk drive storage area may employ two or more recording technologies. For example, the hard disk drive storage area may employ a conventional magnetic recording as well as shingled magnetic recording and/or heat-assisted magnetic recording. In some embodiments, the storage device may include only hard disk drives and the storage areas of the storage device may be configured based on the recording technology employed on the hard disk drives. For example, recording using conventional magnetic recording may have lower latency than recording using shingled magnetic recording and/or heat-assisted magnetic recording. Thus, storing data using conventional magnetic recording may be designated as recording in a low latency storage area, storing data using shingled magnetic recording may be designated as recording in a medium latency storage area, and storing data using heat-assisted magnetic recording may be designated as recording data in a high latency storage area.

In one embodiment, the data module 210 may identify data at a storage device. The data may be received at the storage device and/or data already stored at the storage device. For example, the data may be data stored in a tier of the storage device. The data may be data stored in memory or cache at the storage device, etc. In some cases, the storage device may include an object-based storage device (e.g., storage device 140). Thus, in some embodiments, the data may include a data object. An object-based storage device may manage data as objects, as opposed to other storage architectures like file systems that manage data as a file hierarchy or block storage systems that manages data as blocks within sectors and tracks. Thus, instead of providing a block-oriented interface that reads and writes fixed sized blocks of data, the object-based storage system may organize data into flexible-sized data containers, called objects. An object may include the data, a variable amount of metadata, and a globally unique identifier. In some cases, the object-based storage system may separate file metadata from file data. An object may include file data and the object may be associated with metadata separate from the object that describes the object and its file data. In some cases, an object-based storage device may be connected to the internet and may track data based on globally unique identifiers (GUIDs) associated with objects, one GUID per object. Additionally, or alternatively, the storage device may include a block-based storage device. Thus, in some embodiments, the portion of the data may include a block of data selected based at least in part on an adaptive data sampling criteria.

In some embodiments, analysis module 215 may sample data based on a predetermined sampling frequency (e.g., when sampling block-based data). In some cases, the sampling criteria may be adaptive to detected data heat. For example, a data heat algorithm may be performed in relation to a set of data. The data heat algorithm may detect areas of relatively higher data heat and areas of relatively lower data heat within the set of data. Analysis module 215 may adapt the sampling frequency based on the detected data heat. For example, analysis module 215 may modify the sampling criteria relative to the detected heat (e.g., increasing sampling for data with high heat and/or increasing sampling for data with low heat, etc.). In some cases, analysis module 215 may sample data based on logical address density and heat acceleration. Analysis module 215 may sample and/or increase sampling of logical addresses which are detected to be heating up relatively faster than other logical addresses.

In one embodiment, analysis module 215 may pass at least a portion of the data through a compression algorithm. The portion passed through the algorithm may include a single block of data, two or more blocks of data, or the entire file. In some embodiments, analysis module 215 may select a compression algorithm from among several available compression algorithms and pass the portion of the received data through the selected compression algorithm. Analysis module 215 may analyze a result of passing the portion of the first data through the compression algorithm. In some cases, the result may include a score of compression savings associated with the portion of the first data. In one embodiment, the score of compression savings may include a range of compression savings comprising 0% to 100% savings. If the sample of the first data analyzed receives a score of 0% savings, then the first data may be identified as being fully compressed where no further compressibility is possible. If the sample receives a 100% savings score, then the first data may be identified as being fully compressible.

In some embodiments, the first data may include a data object. Analysis module 215 may pass at least a portion of the data object through the compression algorithm and analyze a result of passing the portion of the data object through the compression algorithm. The result of the analysis may include a score of compression savings associated with the data object. As indicated above, a single data object may be associated with a single file. Thus, analysis module 215 may be assured of analyzing one file at a time by analyzing one object at a time, and thus the analysis module 215 may determine with certainty that a compressibility score associated with an analyzed data object is associated with a single file. In contrast, when block-style data is sampled, the sample size may be associated with two or more files. If one hundred files, each 100 KB to 1 MB in length, are received and sampling is based on analyzing a portion of data for every 1 MB of data (e.g., analyzing one block of data per 1 MB of data), then each sample of 1 MB of data may include one file or two or more files. The particular portion sampled from the 1 MB of data may indicate that the sampled data is fully compressed. Yet, if the sample includes two or more files, only one file from the 1 MB sample, the one file that includes the portion analyzed, may be compressed, while the one or more different files within the 1 MB sample may be uncompressed. Thus, in some cases, sampling block-based files may result in improper steering of data based on the sample size.

In some cases, analysis module 215 may analyze portions of data based on two or more compression algorithms. The compression algorithms may include lossy and/or lossless algorithms to sample and test incoming data. It is noted, when analyzed data indicates the data is uncompressed, data module 210 may compress the data and store it accordingly. Data module 210 may always use lossless compression when compressing and storing data, as using lossy compression may result in loss of data for data that includes financial records, etc. Analysis module 215 may select a compression algorithm based on a determination of which compression algorithm results in the most reliable compressibility scores. For example, analysis module 215 may run two or more different compression algorithms (e.g., lossy, lossless, LZ4, LZSS, H.264, etc.) and determine which compression algorithm provides the most accurate compressibility score. In some cases, analysis module 215 may take multiple samples to determine which algorithm is the most accurate. In some cases, analysis module 215 may select a compression algorithm based on whether the sampled data is associated with a lossy or lossless compression algorithm. Upon determining the sampled data is associated with lossy compression, the analysis module 215 may employ a lossy compression algorithm to analyze the data, etc.

Analysis module 215 may receive a compressibility score and allocation module 220 may steer data to one of two or more storage areas based on the compressibility score. With at least two storage areas, upon determining the result of the compression algorithm analysis indicates the score of compression savings satisfies a threshold associated with the first storage area, allocation module 220 may store the first data in the first storage area. Upon determining the result of the compression algorithm analysis indicates the score of compression savings satisfies a threshold associated with the second storage area, allocation module 220 may store the first data in the second storage area. In one embodiment, at least one of the thresholds may be adaptive in that the thresholds may be adjusted based on a data event. The data event may include new data arriving at the storage device. The new data may be analyzed in relation to the existing data. Based on the data's compressibility score, the data may establish a new high mark or low mark within the existing data (e.g., new data may establish a new data heat high mark or new data heat low mark, etc.). Accordingly, the distribution of the data may be updated based on the arrival of the new data and the adaptive thresholds may be updated for each storage tier accordingly. Thus, a particular set of data that previously satisfied a threshold for a first storage tier may fail to satisfy the threshold after the analysis of the new data establishes new thresholds for each storage tier based on the updated distribution of data. Accordingly, the particular set of data may be moved to a different storage tier based on the updated thresholds.

In one embodiment, analysis module 215 may give data a compressibility score of between 0% and 100% compressibility, where 0% indicates the sampled data is already fully compressed, and 100% indicates the sampled data is fully compressible. In some embodiments, analysis module 215 may give data a compression savings score of between 0% and 100% savings where 0% means the sampled data contains too much entropy for the chosen codec to compress. As one example, allocation module 220 may allocate sampled data to disk (relatively high latency) when the compressibility score is between 0% and 50%, and may allocate sampled data to solid state storage (relatively low latency) when the compressibility score is between 51% and 100%. Alternatively, allocation module 220 may allocate sampled data to disk (relatively high latency) when the compressibility score is between 0% and 20%, and may allocate sampled data to solid state storage (relatively low latency) when the compressibility score is between 21% and 100%. Using an example of at least high latency storage (cold storage for low heat data), medium latency storage (warm storage for medium heat data), and low latency storage (hot storage for high heat data), allocation module 220 may allocate sampled data based on a compressibility score the data receives by the analysis module 215. For example, allocation module 220 may allocate data to the high latency storage when the compressibility score is between 0-25% compressibility, allocate data to the medium latency storage when the compressibility score is 25%-75%, and allocate data to the low latency storage when the compressibility score is 75%-100%.

In some embodiments, data module 210 may receive second data after storing the first data in the first storage area. Upon determining an analysis of the second data indicates a score of higher compressibility than the first data, allocation module 220 may move the first data to the second storage area and store the second data in the first storage area. Upon determining the analysis of the second data indicates a score of lower compressibility than the first data, allocation module 220 may keep the first data in the first storage area and store the second data in the second storage area.

In one embodiment, analysis module 215 may analyze the portion of the first data based at least in part on a time-series data heat algorithm and compare a result from the time-series data heat algorithm analysis to the result of the compression algorithm analysis. Upon determining that the results of each analysis correlate, allocation module 220 may store the first data according to the result of the compression algorithm analysis. Upon determining that the results of each analysis do not correlate, analysis module 215 may take an additional sample and repeat the comparison. In some cases, upon determining that the results of each analysis do not correlate, the analysis module 215 may adjust one or more aspects of at least one of the compression algorithms and/or the time-series data heat algorithm. For example, analysis module 215 may adjust the time-series data heat algorithm to correlate with the compression algorithm analysis. Upon adjusting the one or more aspects, the analysis module 215 may repeat the analysis of each algorithm and compare the results.

In one embodiment, ranking module 205 may rank a plurality of storage areas of a storage device according to at least one property of the plurality of storage areas. In some cases, the at least one property of the plurality of storage areas may include type of storage media, media latency, device reliability, stored data reliability, data retention, device addressability, media durability, media rate, write speed, read speed, sustained write speed, sector overhead time, head switch time, cylinder switch time, power consumption, and operation history. In some cases, data module 210 may obtain a sample of data at the storage device. The data may be new data arriving at the storage device, data stored temporarily in a cache of the storage device, or data previously stored in a non-volatile storage area of the storage device.

In one embodiment, analysis module 215 may analyze a result of passing the sample of data through one or more compression codecs. In some cases, the result may include a score of compression savings associated with the sample of data. Allocation module 220 may store the data in one of the plurality of storage areas based at least in part on the analysis module 215 analyzing the result of passing the sample of data through the one or more compression codecs. In some embodiments, prior to passing the sample of data through the one or more compression codecs, analysis module 215 may pass the sample through a data heat detection algorithm to detect one or more aspects of the data. The one or more aspects of the data may include detecting future expected frequency of access, data usage frequency, data usage patterns, source-of-data patterns, destination-of-data patterns, type-of-data patterns, etc. In one embodiment, the analysis module 215 may determine the likelihood that a sample of data is associated with metadata. In one embodiment, the analysis module 215 may determine the likelihood of the data being metadata based at least in part on passing the sample through a data heat detection algorithm. Additionally, or alternatively, the analysis module 215 may determine the likelihood of the data being metadata based at least in part on passing the sample through a compression algorithm to detect a compressibility related to the sampled data. Upon determining the data is more likely than not to be metadata analysis module 215 may pass the sample of data a single time through one of the one or more compression codecs. Upon determining the data is more likely not to be metadata, analysis module 215 may pass the sample of data two or more times through the one or more compression codecs. In some cases, upon determining the data is more likely than not to be metadata, data module 210 may compress the data using a Huffman code optimized for metadata.

In one embodiment, analysis module 215 may detect a file system type associated with the data based at least in part on analyzing the result of passing the sample of data through the one or more compression codecs. Allocation module 220 may steer the data to one of the plurality of storage areas based at least in part on the detected file system type. Based at least in part on data patterns learned from prior analysis of passing prior samples through the one or more compression codecs, analysis module 215 may bypass at least one of (1) passing samples of subsequent data through one or more heat detection algorithms, and (2) passing samples of subsequent data through the one or more compression codecs. In some embodiments, analysis module 215 may analyze multiple samples of the data simultaneously. The analyzing multiple samples of the data may include passing the multiple samples through the one or more compression codecs using a different compression algorithm per sample and steering the data to one of the plurality of storage areas based at least in part on the analyzing of the multiple samples.

In some cases, the storage device includes a shingled storage area and a non-shingled storage area. For example, the storage device may include one or more hard disk drives. The one or more hard disk drives may employ shingled magnetic recording (SMR) in a first storage area of the one or more hard disk drives and employ conventional magnetic recording (CMR) in a second storage area of the one or more hard disk drives. Upon determining the sample of data satisfies a low compressibility threshold, based in least in part on passing the sample of data through the one or more compression codecs, allocation module 215 may store the data in the shingled storage area. Upon determining the sampled data satisfies a high compressibility threshold, based in least in part on passing the sample of data through the one or more compression codecs, allocation module 215 may store the data in a non-shingled storage area.

In some embodiments, the storage device may include an array of disks. The array of disks may be disks in a distributed data system. For example, one or more of the disks in the array of disks may be in a first data center at a first location (e.g., a first city or country, etc.) and one or more of the disks in the array of disks may be in a second data center at a second location (e.g., second city or country, etc.). Additionally, or alternatively, the array of disks may include a data storage enclosure with one or more trays of disks, the trays of disks each including two or more disks. In some cases, the array of disks may include just a bunch of disks (JBOD) attached to a storage server. Data module 210 may determine which disks in the array of disks are active and sample data from one or more active disks in the array of disks while bypassing sampling data from one or more non-active disks in the array of disks. In some cases, data module 210 may sample new data in real time as the new data is received to be written to the storage device.

Figure 3:
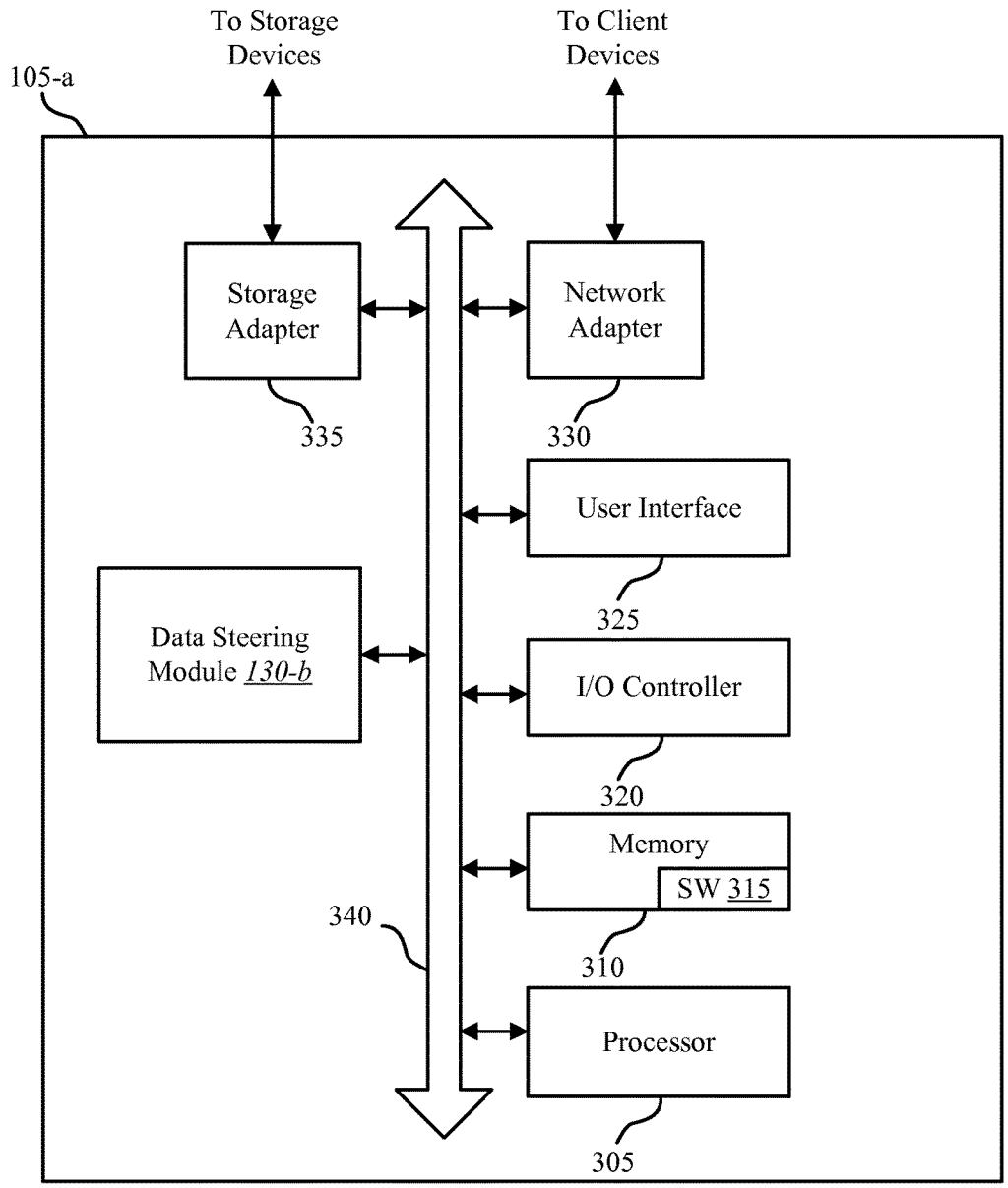
FIG. 3 shows a block diagram of an apparatus in accordance with various aspects of this disclosure.

FIG. 3 shows a system 300 for compression sampling in tiered storage, in accordance with various examples. System 300 may include an apparatus 105-*a*, which may be an example of device 105. Additionally, or alternatively, apparatus 105-*a* may be an example of device 110, 115, and/or 125 of FIG. 1.

Apparatus 105-*a* may include components for bi-directional voice and data communications including components for transmitting communications and components for receiving communications. For example, apparatus 105-*a* may communicate bi-directionally with one or more storage devices and/or client systems. This bi-directional communication may be direct (e.g., apparatus 105-*a* communicating directly with a storage system) and/or indirect (e.g., apparatus 105-*a* communicating indirectly with a client device through a server).

Apparatus 105-*a* may also include a processor module 305, and memory 310 (including software/firmware code (SW) 315), an input/output controller module 320, a user interface module 325, a network adapter 330, and a storage adapter 335. The software/firmware code 315 may be one example of a software application executing on apparatus 105-*a*. The network adapter 330 may communicate bi-directionally—via one or more wired links and/or wireless links—with one or more networks and/or client devices. In some embodiments, network adapter 330 may provide a direct connection to a client device via a direct network link to the Internet via a POP (point of presence). In some embodiments, network adapter 330 of apparatus 105-*a* may provide a connection using wireless techniques, including digital cellular telephone connection, Cellular Digital Packet Data (CDPD) connection, digital satellite data connection, and/or another connection. The apparatus 105-*a* may include a data steering module 130-*b*, which may perform the functions described above for the data steering modules 130 of FIGS. 1, and/or 2.

The signals associated with system 300 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 330 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

One or more buses 340 may allow data communication between one or more elements of apparatus 105-*a* (e.g., processor module 305, memory 310, I/O controller module 320, user interface module 325, network adapter 330, and storage adapter 335, etc.).

The memory 310 may include random access memory (RAM), read only memory (ROM), flash RAM, and/or other types. The memory 310 may store computer-readable, computer-executable software/firmware code 315 including instructions that, when executed, cause the processor module 305 to perform various functions described in this disclosure. Alternatively, the software/firmware code 315 may not be directly executable by the processor module 305 but may cause a computer (e.g., when compiled and executed) to perform functions described herein. Alternatively, the computer-readable, computer-executable software/firmware code 315 may not be directly executable by the processor module 305, but may be configured to cause a computer (e.g., when compiled and executed) to perform functions described herein. The processor module 305 may include an intelligent hardware device, e.g., a central processing unit (CPU), a microcontroller, an application-specific integrated circuit (ASIC), etc.

In some embodiments, the memory 310 can contain, among other things, the Basic Input-Output system (BIOS) which may control basic hardware and/or software operation such as the interaction with peripheral components or devices. For example, the data steering module 130-*b* to implement the present systems and methods may be stored within the system memory 310. Applications resident with system 300 are generally stored on and accessed via a non-transitory computer readable medium, such as a hard disk drive or other storage medium. Additionally, applications can be in the form of electronic signals modulated in accordance with the application and data communication technology when accessed via a network interface (e.g., network adapter 330, etc.).

Many other devices and/or subsystems may be connected to one or may be included as one or more elements of system 300 (e.g., personal computing device, mobile computing device, smart phone, server, internet-connected device, cell radio module, and so on). In some embodiments, all of the elements shown in FIG. 3 need not be present to practice the present systems and methods. The devices and subsystems can be interconnected in different ways from that shown in FIG. 3. In some embodiments, an aspect of some operation of a system, such as that shown in FIG. 3, may be readily known in the art and are not discussed in detail in this application. Code to implement the present disclosure can be stored in a non-transitory computer-readable medium such as one or more of system memory 310 or other memory. The operating system provided on I/O controller module 320 may be iOS®, ANDROID®, MS-DOS®, MS-WINDOWS®, OS/2®, UNIX®, LINUX®, or another known operating system.

The I/O controller module 320 may operate in conjunction with network adapter 330 and/or storage adapter 335. The network adapter 330 may enable apparatus 105-*a* with the ability to communicate with client devices (e.g., devices 110, 115, and/or 125 of FIG. 1), and/or other devices over the network 120 of FIG. 1. Network adapter 330 may provide wired and/or wireless network connections. In some cases, network adapter 330 may include an Ethernet adapter or Fibre Channel adapter. Storage adapter 335 may enable apparatus 105-*a* to access one or more data storage devices (e.g., storage device 140). The one or more data storage devices may include two or more data tiers each. The storage adapter may include one or more of an Ethernet adapter, a Fibre Channel adapter, Fibre Channel Protocol (FCP) adapter, a SCSI adapter, and iSCSI protocol adapter.

Figure 4:
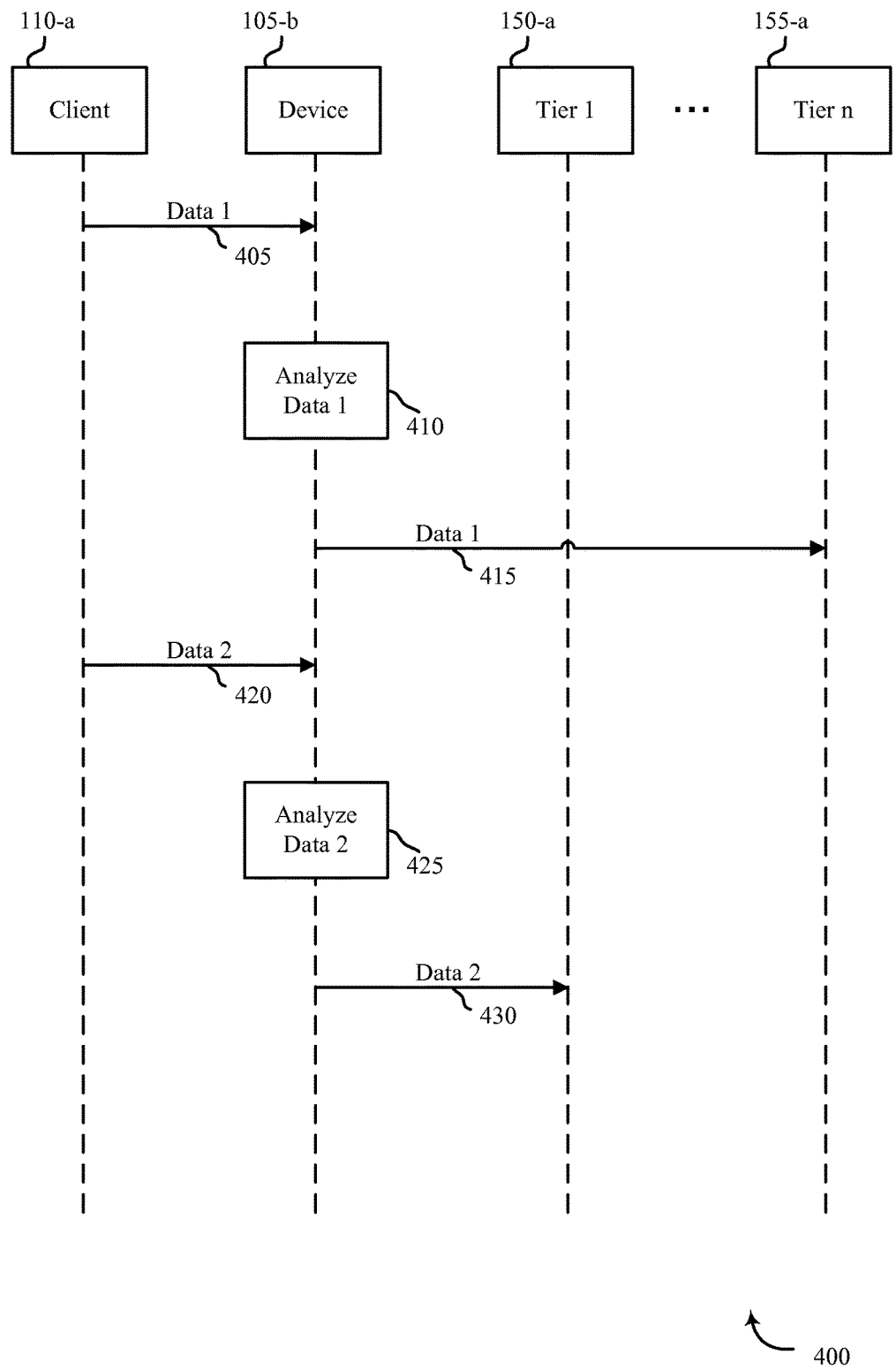
FIG. 4 shows a sequence diagram in accordance with various aspects of this disclosure.

FIG. 4 shows a sequence diagram of a data flow 400 relating to compression sampling in tiered storage, in accordance with various aspects of this disclosure. The data flow 400 illustrates the flow of data between a device 110-*a*, a device 105-*b*, and two or more storage tiers from 150-*a* to 155-*a*. The device 110-*a* may be examples of one or more aspects of device 110, 115, and/or 125 from FIG. 1. Device 105-*b* may be an example of one or more aspects of device 105 of FIG. 1 and/or FIG. 3. In some cases, device 105-*b* may include a computing device such as a smart phone, desktop, laptop, data server, storage server, etc. In some cases, device 105-*b* may include a storage controller, storage enclosure, storage device, and/or a database.

As illustrated, at communication 405, device 110-*a* may send data 1 to device 105-*b*. In some cases, device 110-*a* may send one or more additional portions of data simultaneously and/or subsequently to data 1. At block 410, device 105-*b* may analyze data 1. Device 105-*b* may analyze data 1 in relation to a compression algorithm to determine the compressibility of data 1. The analysis may result in a compressibility score for data 1. In some embodiments, device 105-*b* may determine whether the compressibility score for data 1 satisfies a threshold for one of the storage tiers from tier 1 of 150-*a* to tier n of 155-*a*. In some cases, device 105-*b* may analyze data 1 one or more additional times. For example, device 105-*b* may analyze data 1 in relation to a first compression algorithm and reanalyze data 1 in relation to a second compression algorithm. In some cases, device 105-*b* may analyze data 1 two or more times, each time using a different compression algorithm.

At communication 415, based on the compressibility score for data 1, device 105-*b* may send data 1 to tier n of 155-*a*. At communication 420, device 110-*a* (or another client device) may send data 2 to device 105-*b*. At block 425, device 105-*b* may analyze data 2 to determine a compressibility score for data 2. Based on the compressibility score for data 2, at communication 430, device 105-*b* may send data 2 to storage tier 1 of 150-*a*.

Figure 5:
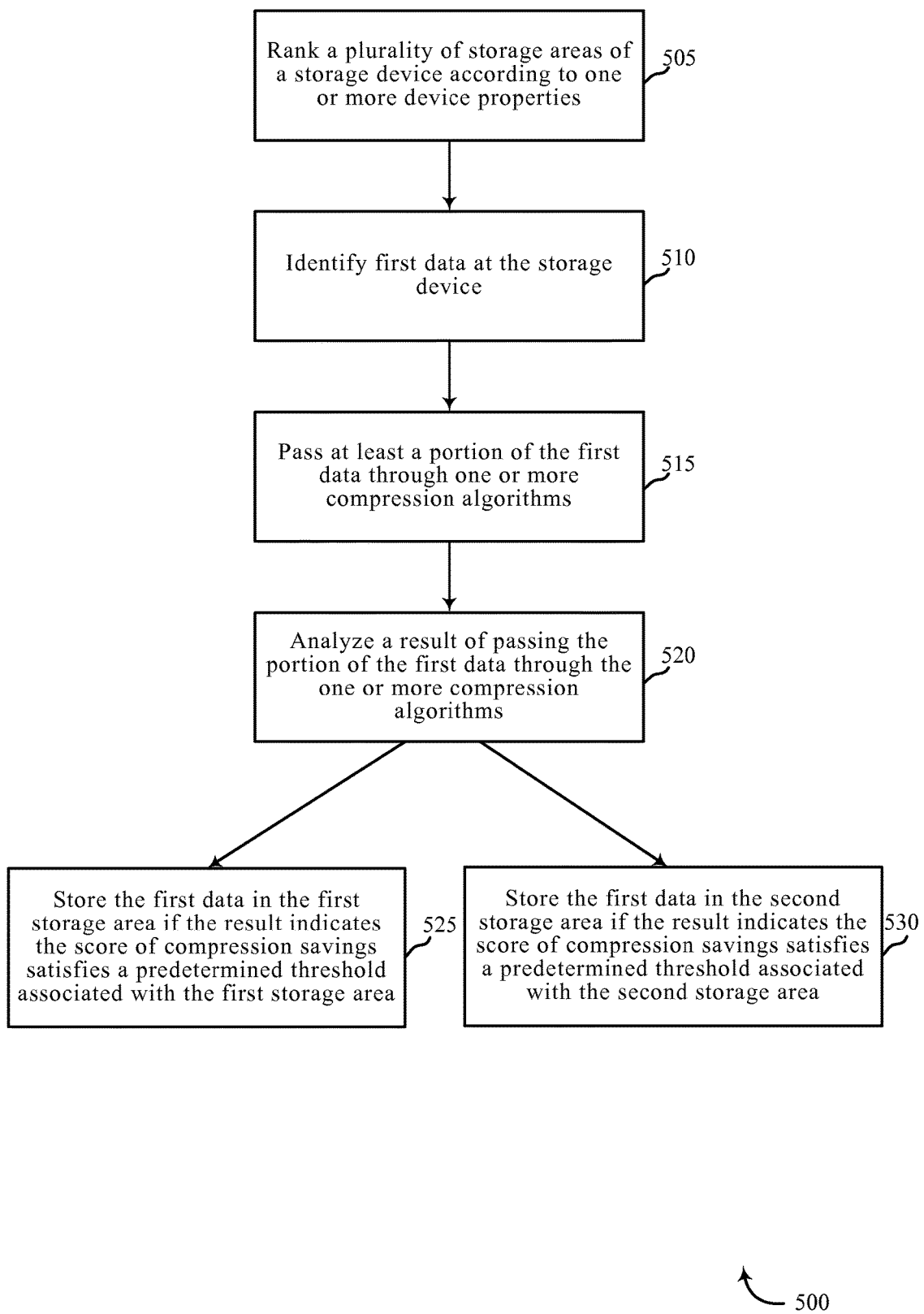
FIG. 5 is a flow chart illustrating an example of a method in accordance with various aspects of this disclosure.

FIG. 5 is a flow chart illustrating an example of a method 500 for compression sampling in tiered storage, in accordance with various aspects of the present disclosure. For clarity, the method 500 is described below with reference to aspects of one or more of data device 105, devices 110, 115, and/or 125, data steering module 130, application 135, and/or storage device 140 described with reference to FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 505, the method may include ranking a plurality of storage areas of a storage device according to device access latency. In some cases, the plurality of storage areas may include a first storage area and a second storage area. At block 510, the method may include identifying first data at the storage device. At block 515, the method may include passing a portion of the first data through a compression algorithm. At block 520, the method may include analyzing a result of passing the portion of the first data through the compression algorithm. In some cases, the result includes a score of compressibility associated with the portion of the first data. At block 525, upon determining the result of the compression algorithm analysis indicates the score of compressibility satisfies a predetermined threshold associated with the first storage area, the method may include storing the first data in the first storage area. At block 530, upon determining the result of the compression algorithm analysis indicates the score of compressibility satisfies a predetermined threshold associated with the second storage area, the method may include storing the first data in the second storage area. The operations at blocks 505-530 may be performed using the data steering module 130 described with reference to FIGS. 1-3 and/or another module.

Thus, the method 500 may provide for compression sampling in tiered storage relating to steering data into two or more storage areas of a storage system based on a sampled compressibility of the data. It should be noted that the method 500 is just one implementation and that the operations of the method 500 may be rearranged, omitted, and/or otherwise modified such that other implementations are possible and contemplated.

Figure 6:
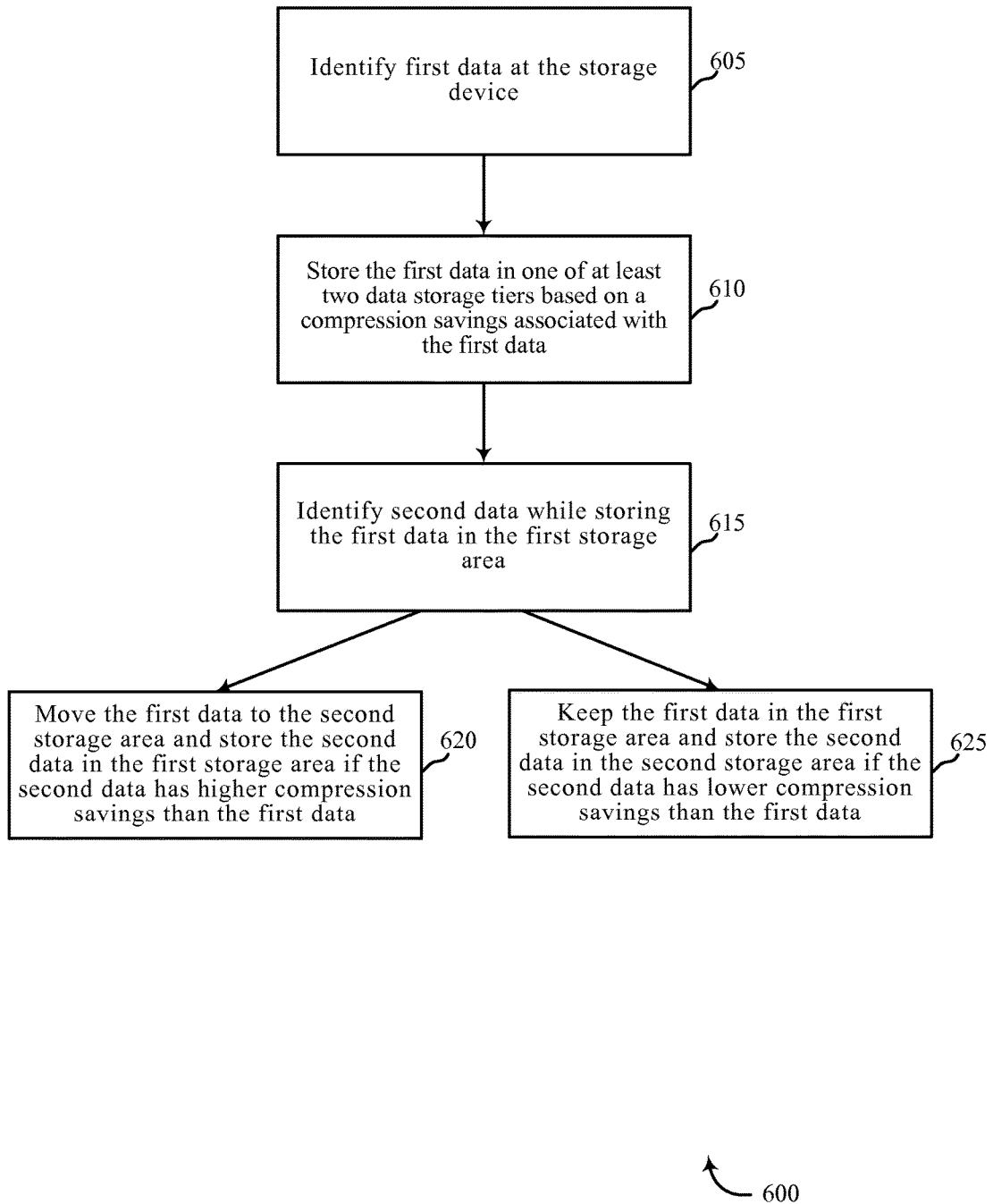
FIG. 6 is a flow chart illustrating an example of a method in accordance with various aspects of this disclosure.

FIG. 6 is a flow chart illustrating an example of a method 600 for compression sampling in tiered storage, in accordance with various aspects of the present disclosure. For clarity, the method 500 is described below with reference to aspects of one or more of data device 105, devices 110, 115, and/or 125, data steering module 130, application 135, and/or storage device 140 described with reference to FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 605, the method may include identifying first data at the storage device. At block 610, the method may include storing the first data in one of at least two data storage tiers based on a compressibility score associated with the first data. At block 615, the method may include identifying second data after storing the first data in the first storage area. At block 620, upon determining an analysis of the second data indicates a score of higher compressibility than the first data, the method may include moving the first data to the second storage area and storing the second data in the first storage area. At block 625, upon determining the analysis of the second data indicates a score of lower compressibility than the first data, the method may include keeping the first data in the first storage area and storing the second data in the second storage area. The operation(s) at block 605-625 may be performed using the data steering module 130 described with reference to FIGS. 1-3 and/or another module.

Thus, the method 600 may provide for compression sampling in tiered storage relating to steering data into two or more storage areas of a storage system based on a sampled compressibility of the data. It should be noted that the method 600 is just one implementation and that the operations of the method 600 may be rearranged, omitted, and/or otherwise modified such that other implementations are possible and contemplated.

Figure 7:
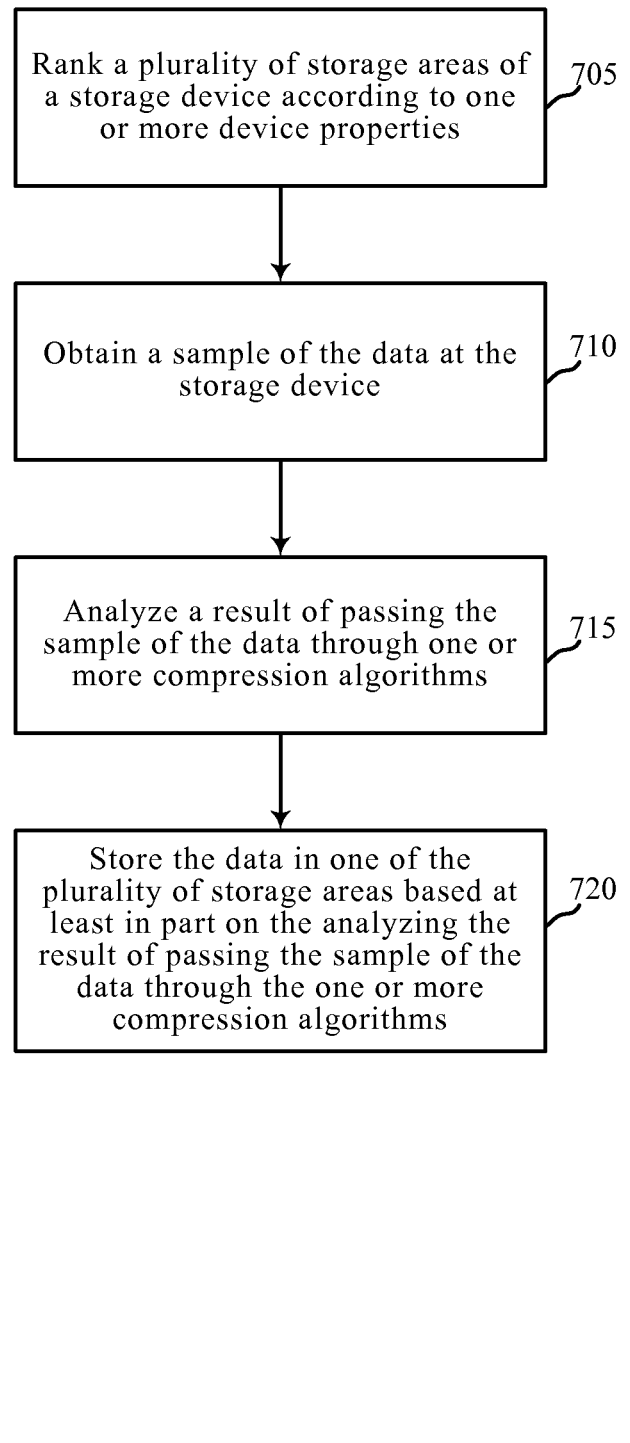
FIG. 7 is a flow chart illustrating an example of a method in accordance with various aspects of this disclosure.

FIG. 7 is a flow chart illustrating an example of a method 700 for compression sampling in tiered storage, in accordance with various aspects of the present disclosure. For clarity, the method 700 is described below with reference to aspects of one or more of data device 105, devices 110, 115, and/or 125, data steering module 130, application 135, and/or storage device 140 described with reference to FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 705, the method may include ranking a plurality of storage areas of a storage device according to one or more device properties. In some embodiments, the at least one property of the plurality of storage areas includes one or more of type of storage media, media latency (e.g., access time, response time, seek time, rotational latency, etc.), reliability, data retention, addressability, data storage durability, media durability, media rate, write speed, read speed, sustained write speed, sector overhead time, head switch time, cylinder switch time, power consumption, operation history, etc. In some cases, the plurality of storage areas may include a first storage area and a second storage area. At block 710, the method may include obtaining a sample of data at the storage device. The data sampled may include new data and/or existing data. For example, the data may include new data arriving at the storage device to be stored. Additionally, or alternatively, the data may include data already stored at the storage area. For example, the data may include data stored at a first storage area that may be sampled to determine whether to keep the data at the first storage area or to move the data to a second storage area. In some cases, new data may arrive at the storage device and the new data may be sampled as well as data already stored at the storage device in order to determine in which storage area to store the new data and whether the data already stored should remain in its storage area or be moved to a different storage area of the storage device. In some cases, new data may be sampled in real time while the new data arrives at the storage device.

At block 715, the method may include analyzing a result of passing the sample of data through one or more compression codecs. In some cases, the result includes a score of compression savings associated with the sample of data. At block 720, the method may include storing the data in one of the plurality of storage areas based at least in part on the analyzing the result of passing the sample of data through the one or more compression codecs. The operations at blocks 705-720 may be performed using the data steering module 130 described with reference to FIGS. 1-3 and/or another module.

Thus, the method 700 may provide for compression sampling in tiered storage relating to steering data into two or more storage areas of a storage system based on a sampled compressibility of the data. It should be noted that the method 700 is just one implementation and that the operations of the method 700 may be rearranged, omitted, and/or otherwise modified such that other implementations are possible and contemplated.

Figure 8:
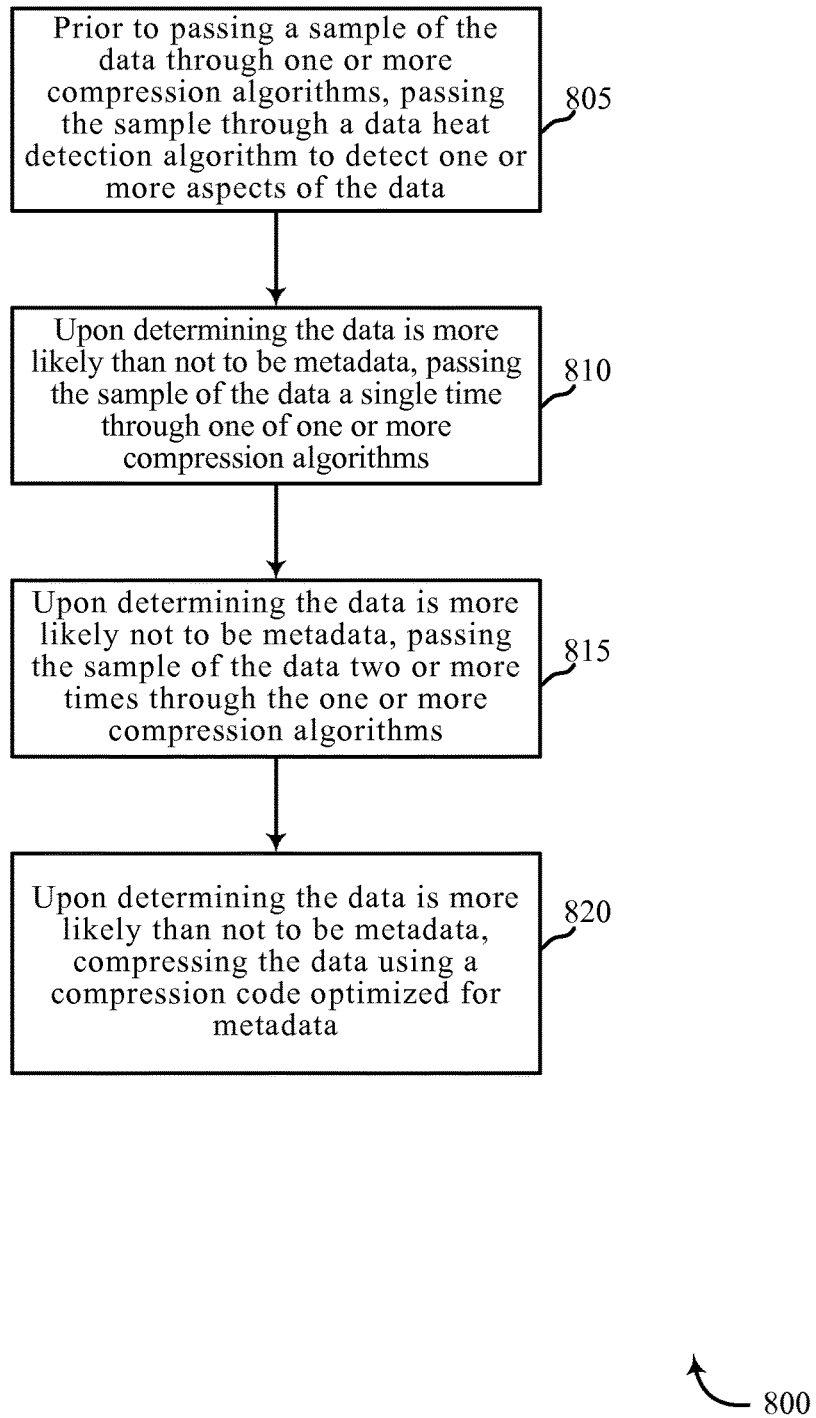
FIG. 8 is a flow chart illustrating an example of a method in accordance with various aspects of this disclosure.

FIG. 8 is a flow chart illustrating an example of a method 800 for compression sampling in tiered storage, in accordance with various aspects of the present disclosure. For clarity, the method 800 is described below with reference to aspects of one or more of data device 105, devices 110, 115, and/or 125, data steering module 130, application 135, and/or storage device 140 described with reference to FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 805, prior to passing a sample of data through one or more compression codecs, the method may include passing the sample through a data heat detection algorithm to detect one or more aspects of the data.

In some cases, based at least in part on passing the sample through the data heat detection algorithm, the method may include determining whether the data is more likely than not to include metadata. At block 810, upon determining the data is more likely than not to be metadata, the method may include passing the sample of data a single time through one of the one or more compression codecs.

At block 815, upon determining the data is more likely not to be metadata, the method may include passing the sample of data two or more times through the one or more compression codecs. In one embodiment, multiple samples of the data may be passed two or more times through the one or more compression codecs. In some cases, each of the one or more samples may be passed through different compression algorithms, such as a first sample through a first algorithm, a second sample through a second algorithm different from the first algorithm, etc. In some cases, the same sample may be passed through multiple algorithms, such as a first sample through a first algorithm, the same first sample through a second algorithm different from the first algorithm, etc. Additionally, or alternatively, a sample data may be passed through the same algorithm two or more times. At block 820, upon determining the data is more likely than not to be metadata, the method may include compressing the data using a Huffman code optimized for metadata. The operation(s) at block 805-820 may be performed using the data steering module 130 described with reference to FIGS. 1-3 and/or another module.

Thus, the method 800 may provide for compression sampling in tiered storage relating to steering data into two or more storage areas of a storage system based on a sampled entropy of the data. High compressibility implies low entropy. Low entropy implies previously uncompressed. Previously uncompressed implies data may imply hot data and hot data may be adaptively cached/tiered in such a way to maximize data management, media latency, power consumption, etc. It should be noted that the method 800 is just one implementation and that the operations of the method 800 may be rearranged, omitted, and/or otherwise modified such that other implementations are possible and contemplated.

In some examples, aspects from two or more of the methods 500, 600, 700, and/or 800 may be combined and/or separated. It should be noted that the methods 500, 600, 700, and/or 800 are just example implementations, and that the operations of the methods 500, 600, 700, and/or 800 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for data steering in tiered storage, comprising:
   ranking a plurality of storage areas of a storage device according to at least one property of the plurality of storage areas, the plurality of storage areas including at least a first storage area and a second storage area, the first storage area including shingled magnetic storage and the second storage area including non-shingled magnetic storage;
   identifying first data at the storage device;
   passing a portion of the first data through one or more compression codecs;
   analyzing a result of passing the portion of the first data through the one or more compression codecs, wherein the result includes a score of compression savings associated with the portion of the first data, a relatively low score of compression savings indicating cold data, and a relatively high score of compression savings indicating hot data;
   upon determining the result of the compression algorithm analysis indicates the first data has a relatively low score of compression savings, storing the first data in the shingled magnetic storage of the first storage area based at least in part on the first storage area having a higher data access latency than the second storage area;
   upon determining the result of the compression algorithm analysis indicates the first data has a relatively high score of compression savings, storing the first data in the non-shingled magnetic storage of the second storage area;
   receiving second data after storing the first data in the shingled magnetic storage of the first storage area;
   upon determining an analysis of the second data indicates a score of higher compressibility than the first data, moving the first data to the non-shingled magnetic storage of the second storage area and storing the second data in the shingled magnetic storage of the first storage area; and
   upon determining the analysis of the second data indicates a score of lower compressibility than the first data, keeping the first data in the shingled magnetic storage of the first storage area and storing the second data in the non-shingled magnetic storage of the second storage area.

2. The method of claim 1, wherein the score of compression savings includes a range comprising 0% to 100% savings.

3. The method of claim 1, wherein the storage device includes an object-based storage device, and wherein the first data includes a data object.

4. The method of claim 3, the method comprising:
passing at least a portion of the data object through the compression algorithm; and
analyzing a result of passing the data object through the compression algorithm, wherein the result includes a score of compression savings associated with the data object.

5. The method of claim 1, wherein the storage device includes a block-based storage device, and wherein the portion of the first data includes a block of data selected based at least in part on an adaptive data sampling criteria.

6. The method of claim 1, wherein the storage device includes at least one hard disk drive.

7. The method of claim 6, wherein the at least one hard disk drive comprises a relatively low latency disk storage area and a relatively high latency disk storage area.

8. The method of claim 1, wherein the storage device includes at least one solid-state drive storage area in addition to at least one hard disk drive.

9. The method of claim 1, wherein the storage device includes at least one non-volatile solid state memory device.

10. The method of claim 1, the method comprising:
analyzing the portion of the first data, the portion based at least in part on a time-series data heat algorithm;
comparing a result from the time-series data heat algorithm analysis to the result of the compression algorithm analysis;
upon determining the results of each analysis correlate, storing the first data according to the result of the compression algorithm analysis; and
upon determining the results of each analysis do not correlate, updating the time-series data heat algorithm to correlate with the compression algorithm analysis.

11. The method of claim 1, the method comprising:
taking multiple compression samples of the first data simultaneously; and
passing the multiple compression samples through a set of different compression algorithms.

12. A computing device configured for data steering in tiered storage, comprising:
a processor;
memory in electronic communication with the processor, wherein the memory stores computer executable instructions that when executed by the processor cause the processor to perform the steps of:
ranking a plurality of storage areas of a storage device according to at least one property of the plurality of storage areas, the plurality of storage areas including a first storage area and a second storage area, the first storage area including shingled magnetic storage and the second storage area including non-shingled magnetic storage;
identifying first data at the storage device;
passing a portion of the first data through one or more compression codecs;
analyzing a result of passing the portion of the first data through the one or more compression codecs, wherein the result includes a score of compression savings associated with the portion of the first data, a relatively low score of compression savings indicating cold data, and a relatively high score of compression savings indicating hot data;
upon determining the result of the compression algorithm analysis indicates the first data has a relatively low score of compression savings, storing the first data in the shingled magnetic storage of the first storage area based at least in part on the first storage area having a higher data access latency than the second storage area;
upon determining the result of the compression algorithm analysis indicates the first data has a relatively high score of compression savings, storing the first data in the non-shingled magnetic storage of the second storage area;
receiving second data after storing the first data in the shingled magnetic storage of the first storage area;
upon determining an analysis of the second data indicates a score of higher compressibility than the first data, moving the first data to the non-shingled magnetic storage of the second storage area and storing the second data in the shingled magnetic storage of the first storage area; and
upon determining the analysis of the second data indicates a score of lower compressibility than the first data, keeping the first data in the shingled magnetic storage of the first storage area and storing the second data in the non-shingled magnetic storage of the second storage area.

13. The computing device of claim 12, wherein the score of compression savings includes a range comprising 0% to 100% savings.

14. The computing device of claim 12, wherein the storage device includes an object-based storage device, and wherein the first data includes a data object.

15. The computing device of claim 14, wherein the instructions executed by the processor cause the processor to perform the steps of:
passing at least a portion of the data object through the compression algorithm; and
analyzing a result of passing the data object through the compression algorithm, wherein the result includes a score of compression savings associated with the data object.

16. The computing device of claim 12, wherein the storage device includes a block-based storage device, and wherein the portion of the first data includes a block of data selected based at least in part on an adaptive data sampling criteria.

17. The computing device of claim 12, wherein the storage device includes at least one of a hard disk drive, a solid-state drive storage area, and a random access memory (RAM) storage area.

18. A non-transitory computer-readable storage medium storing computer executable instructions that when executed by a processor cause the processor to perform the steps of:
ranking a plurality of storage areas of a storage device according to at least one property of the plurality of storage areas, the plurality of storage areas including a first storage area and a second storage area, the first storage area including shingled magnetic storage and the second storage area including non-shingled magnetic storage;
passing a portion of the first data through one or more compression codecs;

analyzing a result of passing the portion of the first data through the one or more compression codecs, wherein the result includes a score of compression savings associated with the portion of the first data, a relatively low score of compression savings indicating cold data, and a relatively high score of compression savings indicating hot data;

upon determining the result of the compression algorithm analysis indicates the first data has a relatively low score of compression savings, storing the first data in the shingled magnetic storage of the first storage area based at least in part on the first storage area having a higher data access latency than the second storage area;

upon determining the result of the compression algorithm analysis indicates the first data has a relatively high score of compression savings, storing the first data in the non-shingled magnetic storage of the second storage area;

receiving second data after storing the first data in the shingled magnetic storage of the first storage area;

upon determining an analysis of the second data indicates a score of higher compressibility than the first data, moving the first data to the non-shingled magnetic storage of the second storage area and storing the second data in the shingled magnetic storage of the first storage area; and upon determining the analysis of the second data indicates a score of lower compressibility than the first data, keeping the first data in the shingled magnetic storage of the first storage area and storing the second data in the non-shingled magnetic storage of the second storage area.

* * * * *